United States Patent
Bahl

(10) Patent No.: US 7,457,626 B2
(45) Date of Patent: Nov. 25, 2008

(54) VIRTUAL PRIVATE NETWORK STRUCTURE REUSE FOR MOBILE COMPUTING DEVICES

(75) Inventor: Pradeep Bahl, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1055 days.

(21) Appl. No.: 10/804,357

(22) Filed: Mar. 19, 2004

(65) Prior Publication Data
US 2005/0208947 A1   Sep. 22, 2005

(51) Int. Cl.
*H04J 3/24* (2006.01)
(52) U.S. Cl. ........................... 455/450; 370/328
(58) Field of Classification Search ............... 455/69.1, 455/252.2, 450, 433, 435.1; 370/254, 328, 370/352, 389, 392, 401
See application file for complete search history.

(56) References Cited

U.S. PATENT DOCUMENTS 6,832,322 B1 * 12/2004 Boden et al. .................. 726/15
2002/0161905 A1  10/2002 Haverinen et al.

OTHER PUBLICATIONS

"Layer Two Tunneling Protocol Extensions (l2tpext)", retrieved from http://www.ietf.org/html.charters/l2tpext-charter.html, last modified Dec. 13, 2004, 5 pages.
V. Rawat, et al., "Layer Two Tunneling Protocol (L2TP) over Frame Relay", Network Working Group, Standards Track, Feb. 2001, 6 pages.
R. Verma, et al., "L2TP Disconnect Cause Information", Network Working Group, Standards Track, Jul. 2001, 9 pages.
B. Patel, et al., "Securing L2TP Using IPsec" Network Working Group, Standards Track, Nov. 2001, 24 pages.
W. Palter, et al., "Layer-Two Tunneling Protocol Extensions for PPP Link Control Protocol Negotiation", Dec. 2002, 9 pages.
Y. T'Joens, et al., "Layer Two Tunneling Protocol (L2TP): ATM Access Network Extensions", Network Working Group, Standards Track, Jun. 2002, 16 pages.
A. Singh, et al., "Layer Two Tunneling Protocol (L2TP) Over ATM Adaptation Layer 5 (AAL5)", Network Working Group, Standards Track, Aug. 2002, 11 pages.
E. Caves, et al., "Layer Two Tunneling Protocol 'L2TP' Management Information Base", Network Working Group, Standards Track, Aug. 2002, 59 pages.

(Continued)

*Primary Examiner*—Sam Bhattacharya
(74) *Attorney, Agent, or Firm*—Wolf, Greenfield & Sacks, P.C.

(57) ABSTRACT

A method and mobile node are disclosed that facilitate persisting virtual private network structures across multiple network addresses assigned to the mobile node. The method includes initially setting up a virtual private network tunnel between a mobile node and a virtual private network tunnel server. Virtual private network structures that support the virtual private network tunnel are based upon a home address specified for the mobile node. When the mobile node changes addresses, the mobile node transmits a binding update to the virtual private network tunnel server specifying the new network address. Thereafter, a mapped relation is created from the new network address to the home address for the mobile node, thereby facilitating continued use of virtual private network structures that are based upon the home address for the mobile node.

36 Claims, 6 Drawing Sheets

OTHER PUBLICATIONS

P. Calhoun, et al., "Layer Two Tunneling Protocol (L2TP) Differentiated Services Extension", Network Working Group, Standards Track, Nov. 2002, 9 pages.

W. Townsley, "Layer Two Tunneling Protocol (L2TP) Internet Assigned Numbers Authority (IANA) Considerations Update", Network Working Group, Best Current Practice, Dec. 2002, 5 pages.

I. Goyret, "Signaling of Modem-On-Hold Status in Layer 2 Tunneling Protocol (L2TP)", Network Working Group, Standards Track, Jul. 2002, 11 pages.

W. Townsley, et al., "Layer 2 Tunneling Protocol (L2TP) Active Discovery Relay for PPP Over Ethernet (PPoE)", Informational, Jun. 2004, 15 pages.

Braun, T. et al., "Secure Mobile IP Communication"; Local Computer Networks, 2001 Proceedings; LCN 2001; 26th Annual IEEE Conference on Nov. 14-16, 2001, Piscataway, NJ, USA IEEE; Nov. 14, 2001; pp. 586-593; XP010584083.

Nuopponen S. Vaarala Netseal A: "Mobile IPv4 Coexistence with IPsec Remote Access Tunnelling; draft-nuopponen-vaarala-mipvpn-00"; IETF Standard-Working-Draft, Internet Engineering Task Force, IETF, CH, Jul. 19, 2002; pp. 1-14; XP015004648.

Berioli, M. et al.; "IP Mobility Support for IPsec-based Virtual Private Networks: an architectural Solution"; Globecom'03; 2003—IEEE Global Telecommunications Conference; Conference Proceedings, San Francisco, Dec. 1-5, 2003; pp. 1532-1536, XP010677551.

Byoung-Jo Kim et al.; "Simple mobility support for IPsec tunnel mode"; Vehicular Technology Conference, 2003; VTC 2003—Fall; 2003 IEEE 58th Orlando Florida Oct. 6-9, 2003; pp. 1999-2003, XP010701342.

\* cited by examiner

VIRTUAL PRIVATE NETWORK STRUCTURE REUSE FOR MOBILE COMPUTING DEVICES

FIELD OF THE INVENTION

This invention generally relates to the area of computer systems. More particularly, the present invention concerns methods and systems for maintaining network connectivity for mobile network nodes. Mobile network nodes include, by way of example, portable computing devices having wireless network communication interfaces. Even more particularly the present invention is directed to methods and systems for ensuring that other nodes in a network are able to communicate with a mobile node even after its current assigned physical network (e.g., Internet Protocol) address changes.

BACKGROUND OF THE INVENTION

Mobile networking services facilitate connecting portable computing devices, generally on a temporary basis, to any of a number of networks as the portable computing devices are transported by users to a variety of locations. Such capabilities are typically, though not always, associated with wireless WAN/LAN connections. For example, a notebook computer may connect to a network (or subnet thereof) via any one of a number of wireless hotspots at geographically diverse locations. When a portable device connects to one of such wireless subnets, the portable device receives a unique network (e.g., Internet Protocol) address. One aspect of mobile computing is enabling other computing nodes to maintain the ability to maintain communications access to a mobile node notwithstanding the fact that is connected to a network using a current address that differs from a permanent "home" address. Thus, mechanisms have been developed to accommodate the substantial likelihood that at some point, the mobile node's network address will change, and thereafter other nodes will seek to communicate with the mobile node at its new network address.

Before describing a prior known way in which networks handled mobile node network address changes, exemplary relevant network protocols will be briefly described. A number of network protocols support building temporary connections for portable computing devices and allocating network addresses for such computing devices. A known Dynamic Host Configuration Protocol (DHCP) enables centralized, automated assignment of Internet Protocol addresses to machines upon connection to a network. DHCP enables computers to be moved to another location in a network and automatically receive a new Internet Protocol address corresponding to the new location. DHCP incorporates a network address "lease" functionality that assigns a variable amount of time that a particular assigned Internet Protocol address will be valid for a connected computer. The DHCP is particular useful in network environments where a limited number of Internet Protocol addresses are available for assignment to a large number of computers.

A Point-to-Point Protocol (PPP) is a communications protocol for serial communications between two computers (e.g., a personal computer connected to a server via a phone line). PPP uses the Internet Protocol and provides data-link layer (layer two) services. In particular, PPP packages TCP/IP or other network later protocol packets and forwards them from a client to a server operating as the client's gateway to the Internet.

Other protocols that are potentially relevant to mobile computing include a Point-to-Point Tunneling Protocol (PPTP) and Layer Two Tunneling Protocol (L2TP). The PPTP, an extension of PPP, facilitates extension of a network through private "tunnels" over public networks (e.g., the Internet). This form of interconnection is referred to as a Virtual Private Network (VPN) and enables a computer having PPP client support to establish a secure connection to a server via an Internet service provider. L2TP is a variation of PPTP. Both these tunneling protocols use a local access concentrator to enable packets to be tunneled over public network links thereby avoiding potentially needing to establish a long distance phone connection to ensure secure communications between a client and server.

In a known networking environment, a mobile computing node is assigned a relatively permanent network address associated with a "home" network location. However, when the mobile node connects from a location outside its home network, a network communications server, using for example DHCP, assigns a temporary current address to the mobile node in support of the connection outside the home network location. During the time that the mobile node is using a temporary current address rather than its home address, correspondent nodes (i.e., other nodes seeking to communicate with the mobile node) will use an address previously provided for the mobile node. Typically, unless informed of a mobile node's current, non-home address, correspondent nodes use the mobile node's home (permanent address) address when transmitting packets to the mobile node. If the mobile node is connected at a network location differing from its home location, the home address does not match the mobile node's current address. Such instances are accommodated, in a known network arrangement, by providing a home agent for the mobile node on the mobile node's home network. The home agent maintains the current address of the mobile node having a particular home network address. The home agent receives packets addressed to the mobile node's home network address, encapsulates the packets according to a tunneling protocol, and passes the encapsulated packets to the current address of the mobile node. The "from" and "to" addresses of the envelope identify the home agent and the temporary current point of attachment of the node respectively, while the encapsulated packets identify the original source and destination addresses of the received packets.

The following illustrates the operation of a known home agent-based mobile networking arrangement. A mobile node having a home network address of 1.1.1.1 is currently remotely connected to its home network via a temporarily assigned non-local address of 2.2.2.2. A correspondent node, having a network address of 7.7.7.7, is communicating with the mobile node using its home address of 1.1.1.1. The home agent (having an address of 1.1.1.0), aware of the mobile node's current non-local address of 2.2.2.2, intercepts packets identifying the mobile node's home address (1.1.1.1). The home agent encapsulates the packets directed to the home address 1.1.1.1 according to a tunneling protocol. The resulting encapsulated packets specify the home agent's source address (1.1.1.0) and the mobile node's current address (2.2.2.2).

Home agents solve a number of network address tracking problems that arise within a mobile node networking environment. For example, if both a correspondent node and a mobile node move concurrently, binding updates provided by each node to the last known address of the node can be lost. If the two nodes had been engaged in a session, the session cannot continue due to the loss of proper addresses. On the other hand, if a home agent exists for each of the two nodes, then both nodes can continue communications using the home addresses for the nodes. The home agents, intercept and pass (tunnel) the packets identifying the home addresses to the current ("care of") addresses for the mobile and correspondent nodes.

Another potential address tracking problem that arises with regard to mobile nodes involves the ability of new nodes to contact the mobile node in the event that domain name system (DNS) servers, that associate names with network addresses, have cached the old address for a name associated with the mobile node. In such instances, the DNS servers, or more generally name servers, continue to provide the old/invalid address until the time to live (TTL) for the cached address, specified for the named mobile node, expires. A home agent addresses this problem by intercepting (and thereafter tunneling to the mobile node) packets containing the (home) address of the mobile node that is provided by the DNS servers to new nodes. The mobile node, upon receiving the tunneled packets, can inform the new nodes of its new address via binding updates (and the home agent is thereafter by-passed).

Yet another address tracking problem involves moving a mobile node behind a network address translator/firewall. In this case a home agent tunnels traffic from new clients to the mobile node. The home agent has an open port for communication with the mobile node as a result of previous communications initiated by the mobile node to the home agent from behind the NAT/firewall. The new clients communicate indirectly with the mobile node (through the home agent) using the known home address of the mobile node. Home agents, while increasing the complexity of managing network addresses/communications, are considered valuable, if not indispensable, components within networking environments populated by mobile nodes.

Still yet another challenge involving mobile nodes is the possibility of the mobile node changes addresses while still external to its home network after creating a virtual private network tunnel to its home network. The new address renders previously created virtual private network tunnel structures obsolete. In such instances, a new tunnel and associated structures, including network security structures, is created each time the mobile network address changes. In the case of a highly mobile network node, such disruptions greatly diminish the overall user experience.

SUMMARY OF THE INVENTION

The present invention comprises a method and network administration framework that addresses problems described above that arise when mobile nodes are assigned new network addresses. In particular, the present invention comprises a method performed by a mobile node that persists virtual private network structures across multiple network addresses assigned to a mobile node. Initially, a virtual private network tunnel is established between the mobile node and a virtual private network tunnel server. Virtual private network structures supporting the virtual private network tunnel are based upon a home address specified for the mobile node. Thereafter, the mobile node is assigned a new network address. The new network address differs from the home address for the mobile node.

The mobile node informs the virtual private network tunnel server of its new network address by transmitting a binding update to the virtual private network tunnel server that specifies the new network address. A mapped relation is created from the new network address to the home address for the mobile node. The mapped relation, along with substitution logic within lower layers of network communication protocol stacks, facilitates continued use of virtual private network structures that are based upon the home address for the mobile node.

The invention is further embodied in a mobile node and computer-executable instructions that incorporate the above address mapping functionality. Furthermore, the reuse of virtual private network structures can take a variety of forms in accordance with particular embodiments of the invention including: security structures and tunnel structures.

Furthermore, in embodiments of the invention the method further comprises the VPN tunnel server updating a mapping structure such that the new address for the mobile node is mapped to the home address that will be used to perform certain security and tunnel operations using the reused tunnel data structures. The mobile node also maintains such mapped address relations. Thus, after creating a mapped relation between the home address and new network addresses, upon receiving, by the mobile node, a message packet from the virtual private network tunnel server including the new network address, the mobile node replaces the new network address by the home address in a destination field of the received message packet. In an embodiment of the invention, the substitution is performed at an intermediate (e.g., IP—Internet Protocol) layer of the TCP/IP protocol stack. Furthermore, such substitution is carried out in the reverse message transmission direction by the virtual private network tunnel server on packets received from the mobile node (based upon a home address provided in an extension of received messages).

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE DRAWINGS

Figure 1:
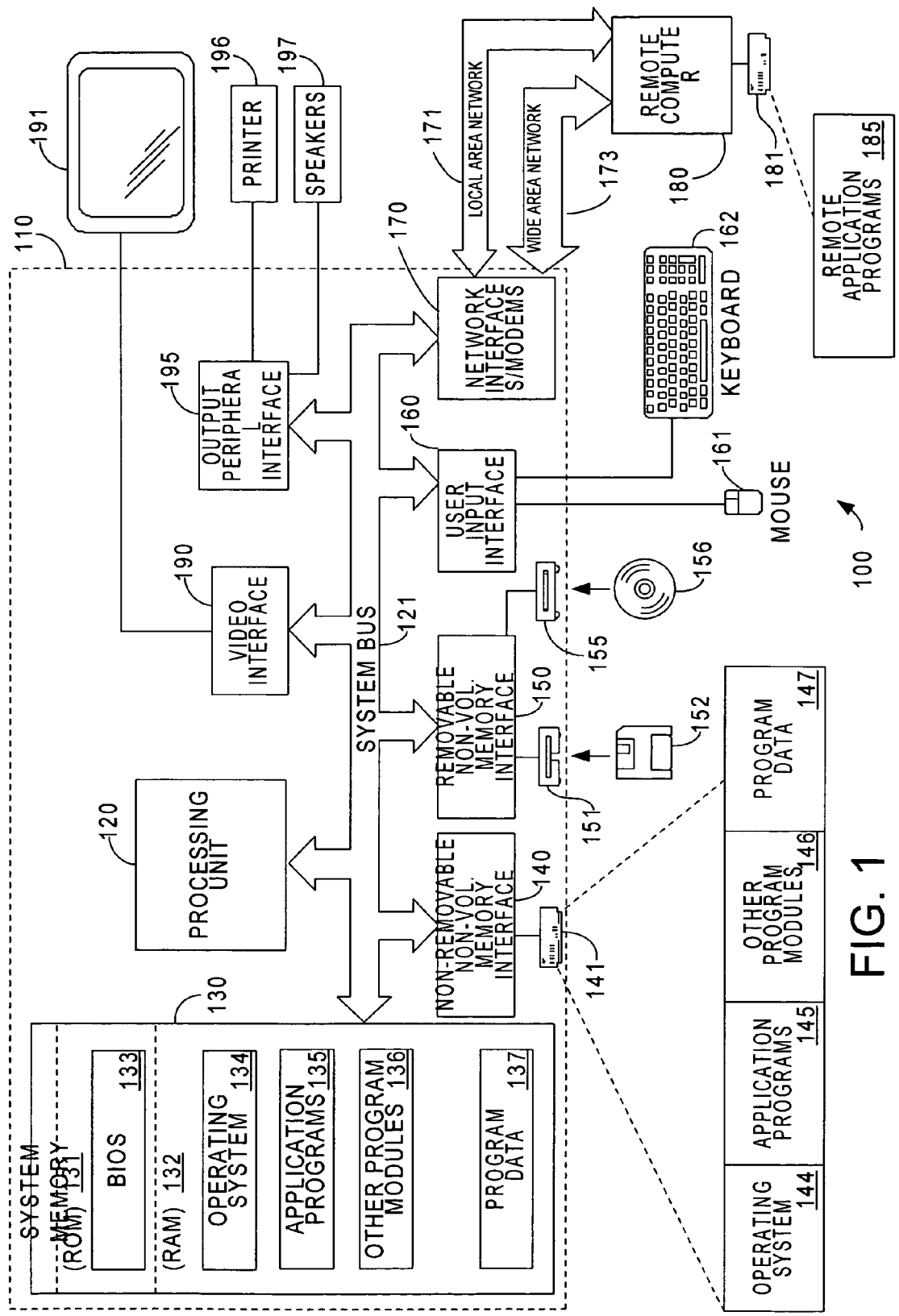
FIG. 1 is a simplified schematic illustrating an exemplary architecture of a computing device for carrying out an embodiment of the present invention.

An illustrative method and framework for supporting changing addresses associated with mobile network nodes are disclosed herein. Such support is provided through enhancements to the mobile network nodes and utilizes DNS, Dynamic Host Configuration Protocol (DHCP), and Virtual Private Network (VPN) servers (or their functional equivalents) to dynamically assign a current network address to a mobile node, provide the current network address to an authoritative name server, and thereafter have correspondent nodes update their addresses for the mobile node based upon an address provided by the authoritative name server—as opposed to a cached address at a replicated name server.

More particularly, a mobile node registers all of its name-to-address mappings with its authoritative DNS server using a time to live of zero. Specifying a time to live of zero ensures that a non-authoritative (caching/replicated) DNS server or DNS name resolver on a client will not store the name/address combination in its cache. Therefore, when a correspondent node loses track of a mobile node's current address, due to a location change by the mobile node, the correspondent node will not rely upon an old address stored within the non-authoritative leaf DNS server or its own name resolver cache.

A second aspect of the illustrative embodiment of the invention comprises configuring mobile nodes to initiate a virtual private network connection to a virtual private node server for a security domain, with which the mobile node is associated, when the mobile node establishes a connection from outside the security domain. The mobile node, after initially logging onto a new network outside its home security domain (and receiving a new address configuration on the new network), establishes a tunneled connection into its home security domain via a VPN server within its home security domain. The VPN server establishes a new address for the mobile node within the home security domain. The new address is stored in the authoritative DNS server for the home security domain (with a time to live of zero). Upon registering an address failure using a former address for the mobile node, correspondent nodes obtain the new address provided by the authoritative DNS server to communicate with the mobile node via the tunneled connection supported by the VPN server. Establishing a virtual private network connection is not necessary in cases where a security domain is public—i.e., the machines on the network are directly accessible to other machines on other networks.

Furthermore, in the illustrative embodiment of the invention, a previously established VPN tunnel is re-used when a mobile node moves to a new external network address. Such capabilities are facilitated by using extension headers supported in mobile Internet Protocol packets and a binding update issued to a responsible VPN server to map a current external care of network address to a home address for the mobile node that forms the basis for the re-used structures maintained in accordance with the VPN tunnel. Thus, after initially setting up the VPN tunnel and its associated structures, the structures are maintained as the mobile node receives new external care of network addresses.

FIG. 1 illustratively depicts an example of a suitable operating environment 100 for a mobile computing device (e.g., a notebook or tablet computer) used in an environment supported by multiple, communicatively coupled networks to which the mobile computing device is capable of connecting. The operating environment 100 is only one example of a suitable operating environment, and is not intended to suggest any limitation as to the scope of use or functionality of the invention. Other well known computing systems, environments, and/or configurations that may be suitable for use with the invention include, but are not limited to, personal computers, server computers, laptop/portable/tablet computing devices, multiprocessor systems, microprocessor-based systems, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention is potentially incorporated within network nodes operating in distributed computing environments where tasks are performed by remote processing devices that are linked through a communications network. In a distributed computing environment, program modules are generally located in local and/or remote computer storage media including memory storage devices.

With continued reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media such as wireless PAN, wireless LAN and wireless WAN media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during startup, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through one or more wired/wireless network interfaces 170. Furthermore, the set of one or more wired/wireless network interfaces 170 support communications over the WAN 173. While not shown in FIG. 1, the computer 110 potentially includes an internal or external modem, connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Before describing an exemplary network environment in which the present invention is advantageously incorporated, terminology used to describe an embodiment of the invention will be provided. In general, the present invention is practiced in a network environment including enterprise networks (e.g., networks maintained by a company) that are typically protected by a firewall that includes one or more virtual private network (VPN) servers incorporated therein. Thus, users can access the resources/entities connected to the enterprise networks by initially connecting to public and home networks (i.e., those within a home) and thereafter establishing a VPN tunnel into the enterprise networks.

A "security domain" is a smallest domain of interconnectivity with access to/from the domain limited in some form of another (e.g., requiring identification/authentication of users via a logon process). Examples of security domains include: a home network protected by a firewall/NAT; an enterprise network protected by a perimeter firewall; and an unprotected public network such as the Internet where access is unprotected, but its domain breadth is delimited by perimeter firewalls established by other security domains to which it is connected.

A "mobility domain" is a node's domain in which sessions established with the node remain intact as the node moves within and/or across one or more security domains. A mobility domain potentially spans multiple security domains.

Figure 2:
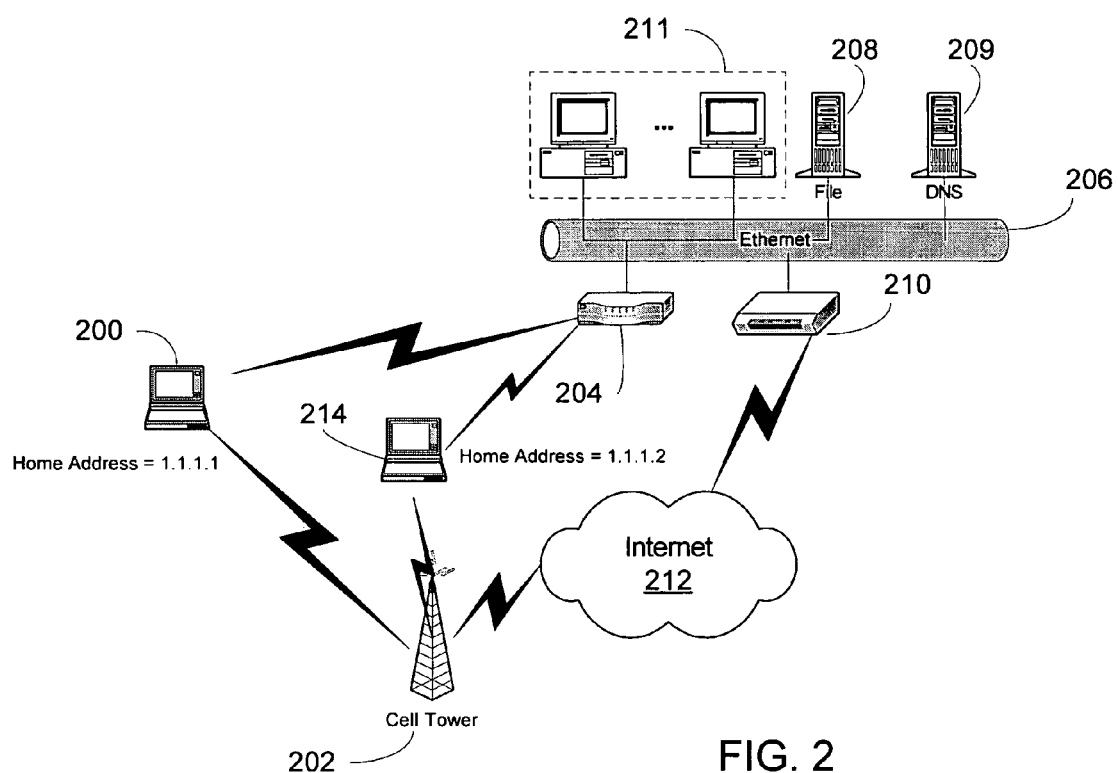
FIG. 2 is an exemplary network environment wherein one or more mobile nodes are communicatively coupled to a home network through any one of a variety of remote network locations and receive a dynamically assigned address differing from relatively static home addresses assigned to the mobile nodes within the home network.

Turning to FIG. 2, a simple example of a network computing environment is depicted wherein the invention is potentially exploited. In the illustrative environment, a mobile node 200, in the form of virtually any portable computing device (e.g., a notebook or tablet PC, a PDA, smart phone, etc.), includes one or more network interfaces (not specifically shown) facilitating connectivity to a variety of networks via multiple network interface technologies. In the particular example depicted in FIG. 2, the mobile node 200 potentially communicates through a wireless transceiver 204 (via 802.11 a/b/g media rules/protocols) that is communicatively coupled to a local area network 206 corresponding to the mobile node 200's home network. The wireless transceiver 204 (also referred to as a wireless access point, or WAP), provides access to a variety of resources on the LAN 206. For example, the wireless transceiver 204 provides access by the notebook computer 200 to directories maintained on a file server 208 and naming services supported by a DNS server 209.

Mobile nodes 200 and 214, as their name suggests, are capable of moving to, and establishing a new network address, on a network differing from their home network (associated with Ethernet link 206). In the illustrative mobile networking environment set forth in FIG. 2, the mobile nodes 200 and 214 access a variety of networks/resources, including one another, while residing outside their home network, via a cellular transmission network including a cellular transmission tower 202. In the mobile networking environment illustratively depicted in FIG. 2, the mobile nodes 200 and 214 communicate with entities connected (either directly or indirectly) to other networks, including the LAN 206, via the cellular transmission tower 202 that provides a first hop connection to a cellular network that is, in turn, connected to the Internet 212. When the mobile nodes 200 and 214 reside outside their home network (i.e., LAN 206), a gateway/firewall/modem 210, including/associated with a virtual private network (VPN) server, supports communications between the Internet 212 and computing devices connected to the LAN 206. The VPN server component enables authentication of network traffic at the perimeter of the LAN 206 by requiring outside nodes to establish a VPN tunnel. In the absence of a VPN server, the gateway/firewall/modem 210 in many cases will accept responses to requests that are issued from an entity that resides behind the firewall. The gateway/firewall/modem 210 also provides access by users of the Internet 212 to resources on the LAN 206.

Applications executing on the mobile nodes 200 and 214 potentially establish network connections and communicate, in a peer-to-peer arrangement, with statically connected client nodes 211 (e.g., desktop PCs), as well as other mobile nodes, via the wireless transceiver 204 and the cellular transmission tower 202. The DNS server 209 supports such peer-to-peer connections by providing current addresses for named network entities. The DNS server 209 maintains, for a named network entity, a corresponding address(es) (i.e., address(es) on the home network of the named network entity) for that name. In the case of mobile nodes, such as nodes 200 and 214, the current address potentially differs from the home address in cases where the mobile node is not currently connected to its home network. By way of example, mobile node 200 is assigned a home network address of 1.1.1.1, and mobile node 214 is assigned a home address of 1.1.1.2. When the mobile nodes 200 and 214 connect to another network, they receive a dynamically assigned network address differing from their assigned home addresses.

The DNS server 209 provides a current address for a named network entity, including a mobile node, in response to naming requests submitted by network entities seeking to establish/re-establish a connection with the named entity. Furthermore, the name/address correlation tables utilized by DNS servers, such as DNS server 209 may be replicated to improve access. Of the multiple DNS servers, one such server is designated as "authoritative" for a given network entity.

When a mobile node moves to a new network address, the current address maintained within a naming cache by a non-authoritative DNS server for a mobile node (e.g., mobile nodes 200 and 214) can temporarily be incorrect. The incorrect address remains within the naming cache until it is either replaced by an updated address, due to replication if existent between the DNS servers, or its time-to-live (TTL) goes to zero. As a consequence, when a mobile node changes addresses, an existing session with an application executing on a correspondent network node is lost/disrupted until the new address for the mobile node is discovered and bound to the stack. The re-discovery process is further complicated in instances where both nodes in a peer-to-peer connection are mobile nodes (e.g., nodes 200 and 214), and the mobile nodes leave their home network (and thereby lose access to an authoritative DNS server) at substantially the same time.

Figure 3:
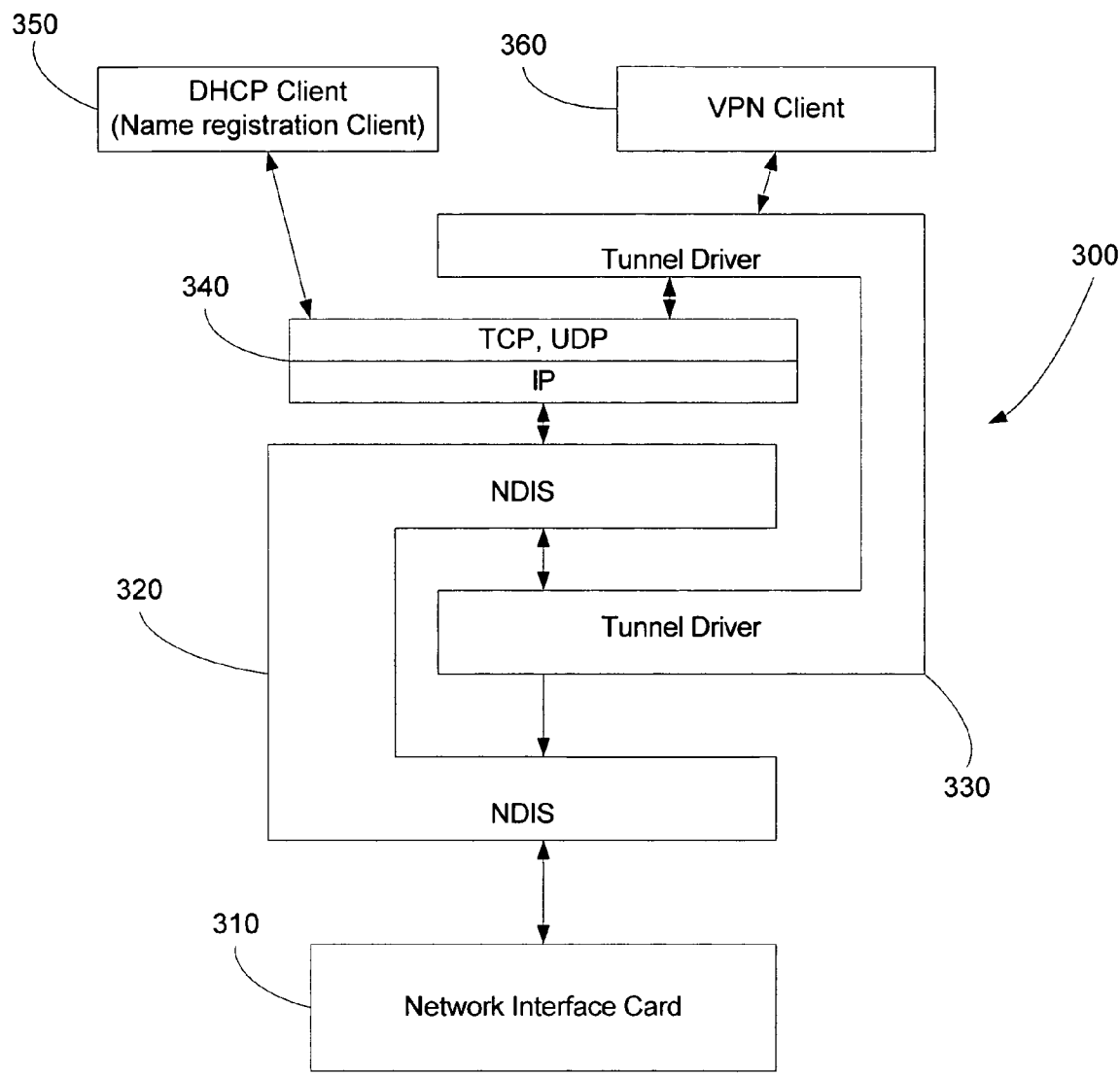
FIG. 3 summarizes an exemplary communications stack for a networked node suitable for practicing the present invention.

Turning briefly to FIG. 3, an exemplary protocol stack 300 is schematically depicted for the mobile node 200 embodying the present invention. The illustrative protocol stack 300 includes, at a physical layer, a network interface card (NIC) 310 sends and receives communications via a physical interface on the mobile node 200. The NIC 310 communicates via a network driver interface 320 (e.g., NDIS) with upper layers of the protocol stack 300. One such upper layer comprises a VPN/tunnel driver 330. The VPN/tunnel driver 330 supports a tunnel connection between the mobile node 200 and a VPN server. The VPN/tunnel driver 330 packages messages in an appropriate envelope identifying a non-local address outside the security domain of the mobile node 200's home security domain. The VPN/tunnel driver 330 is by-passed when the mobile node is not utilizing the VPN/tunneling functionality to communicate on its home network (LAN 206). In the illustrative embodiment depicted in FIG. 3, NDIS 320 is shown wrapping a portion of the tunnel driver 330 as it is used by the VPN/tunnel driver 330 to interface both the NIC 310 and a TCP/IP layer 340.

The TCP/IP layer 340 (also including UDP driver functionality) is positioned above and below the VPN/tunnel driver 330 in the exemplary embodiment—reflecting that, in the illustrative embodiment, the VPN/tunnel driver 330 is both a client as well as a driver called by the TCP/IP layer 340. The TCP/IP layer 340 carries out known transport layer operations. The TCP/IP layer 340, in an embodiment of the invention, includes conditionally executed procedures such that if no acknowledgement is received from a relocated mobile correspondent node in response to a binding update (when the mobile node 200 receives a new network address), then the TCP/IP layer 340 issues a naming query with regard to the correspondent node to obtain a newest available network address available from a DNS server that the stack of the mobile node is configured to query.

A name registration client 350, which in exemplary implementations is a part of a dynamic host configuration protocol (DHCP) client of the mobile node 200, includes a functional modification ensuring that propagation delays in getting a changed network address from an authoritative DNS server 209 to leaf DNS servers will not result in correspondent nodes receiving outdated information from the leaf DNS servers. In a particular embodiment of the invention, the name registration client 350, which operates to establish a network address for the mobile node 200 within the home network security domain, provides a current address to its authoritative DNS server 209 with a further directive that leaf DNS servers are not to store the name/address combination for the mobile node within their naming caches. In a particular embodiment of the invention, such functionality is achieved by the name registration client 350 providing a name/network address update to the authoritative DNS server 209 with a time-to-live (TTL) of zero. Non-authoritative DNS servers will not cache an address resolution response from an authoritative DNS server where the response specifies a TTL of zero. As a consequence, all naming requests for the mobile node 200 are resolved by sole reference to the name/address resolution information maintained by the authoritative DNS server 209. For purposes of scalability, only a mobile node will include the TTL of zero functionality. Such mobility can be automated by means of detecting a startup whether the node is configured for mobility (e.g., on battery power and DHCP is enabled).

The last identified component of FIG. 3 is a VPN client 360. In the illustrative embodiment of the invention, the VPN client 360 initiates establishing a VPN tunnel connection with a VPN server residing on a security domain differing from a security domain within which the mobile node 200 currently resides. In other embodiments of the invention, no VPN server is present on the mobile client's home network. In that case, the mobile node establishes a link back into the firewall protected LAN 206 via a known "rendezvous" server. The rendezvous server resides outside the LAN 206 and is accessible by the mobile node. The rendezvous server maintains a constant connection to a node inside the LAN 206 and utilizes the connection to inform a node on the other side of the LAN 206's firewall that mobile node 200 seeks to establish a connection with the node.

Figure 4:
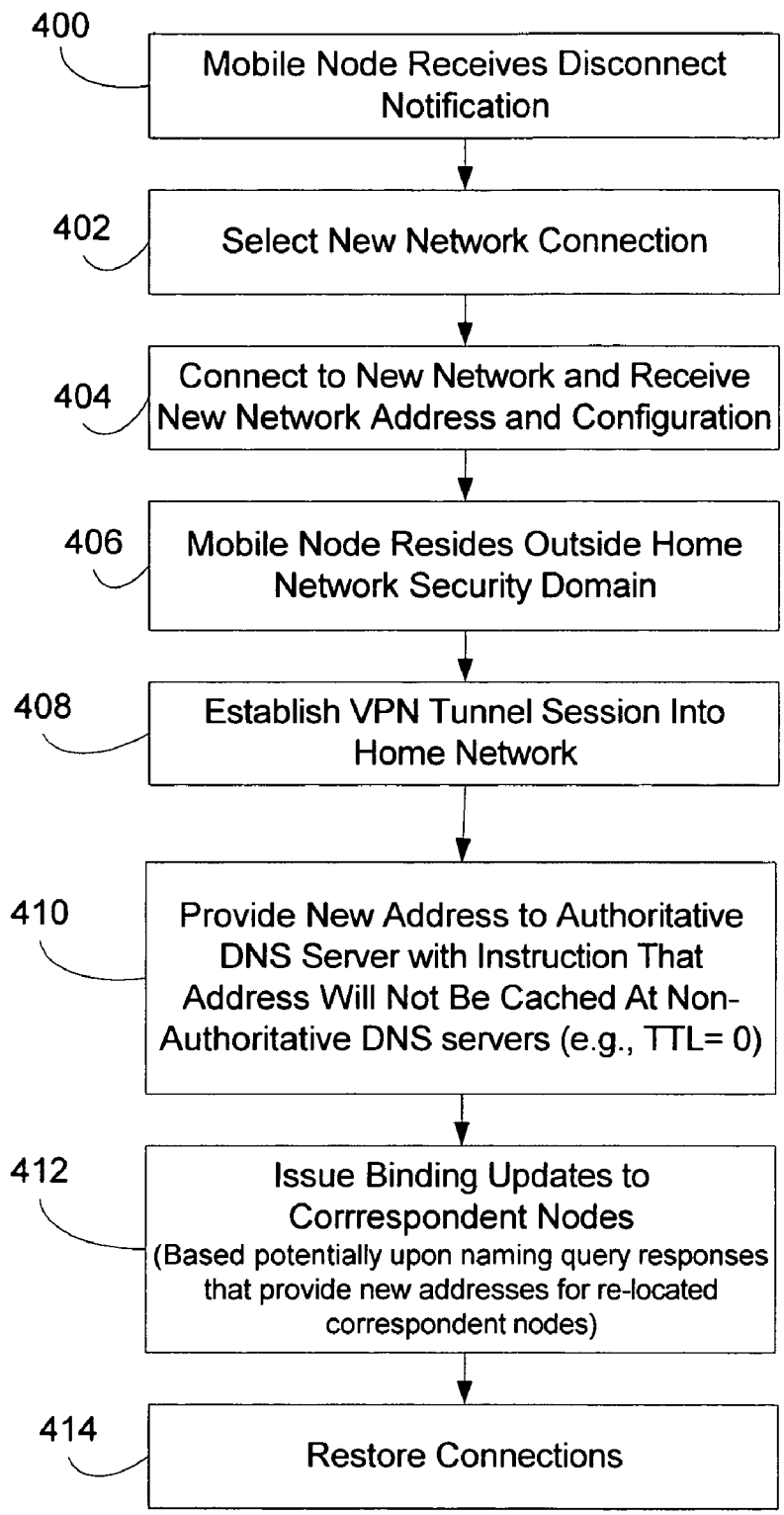
FIG. 4 summarizes a set of steps performed by a mobile node to connect to a non-home network at an address differing from a previous network address assigned to the mobile node.

Turning to FIG. 4, a set of exemplary steps performed by a mobile node (for example mobile node 200) are summarized for re-establishing a connection to a correspondent node, such as mobile node 214, that is lost/disrupted due to the mobile node 200 changing its location from a home network address (1.1.1.1) to a network address associated with another network, such as a cellular network accessed via the transmission tower 202. The mobile node 200 previously provided its home address to its authoritative DNS server 209 with the directive that the address should not be cached in non-authoritative DNS servers (e.g., specifying a TTL of zero). It is further assumed that no home agent exists for the mobile node 200. However, a VPN server is incorporated into the gateway/firewall/modem 210. In an illustrative example, after disconnecting from LAN 206 the mobile node 200, the mobile node 200 establishes a VPN tunnel connection, through the gateway/firewall/modem 210 into its home network, LAN 206, from its new address on the cellular network.

Initially, at step 400 the mobile node 200 receives a disconnect notification indicating that the mobile node 200 is no longer connected to LAN 206. Such disconnect notification can arise from any of a variety of circumstances including, by way of example, a user breaking a network connection between the mobile node 200 and the LAN 206. In response, a network communications protocol stack on the mobile node 200 processes the disconnect notification and issues notifications to affected components on the mobile node 200. By way of example, upon receiving a disconnect notification a protocol stack component, or an application residing above the protocol stack, generates a dialog box inviting the user to establish a new connection. The dialog box, in an exemplary embodiment, presents a set of available networks/interfaces/modes of communication to the user. It is also noted that in some instances, the NDIS and TCP/IP stacks may not receive a disconnect notification (e.g., mobile wireless). Instead, the mobile node will receive a media connect notification from a new access point.

Continuing with the current example, at step 402 the user (or possibly a criterion-driven automated network selection component executing upon the mobile node 200) selects a new network to which a connection will be established. In the illustrative example, the user selects the cellular network associated with the transmission tower 202. Thereafter a set of steps are performed to establish a new network connection to the mobile node 200's home network (LAN 206) and connect to a correspondent node through the new network connection.

During step 404 the mobile node 200 connects/logs-on to the cellular wireless network (having a separate security domain from the LAN 206) and is dynamically assigned a new network address (e.g., 3.3.3.1) on the cellular network that differs from its home network address (1.1.1.1) and configuration. The DNS server for the new network is updated to include the new address (and name of the mobile node within the new security domain) of the mobile node within its name resolution table. Thus, for example, in the instance where the mobile node 200 disconnects from a connection to LAN 206 via wireless transceiver 204 and re-connects to the cellular network via the transmission tower 202, the network address assigned to the mobile node 200 changes from the home address "1.1.1.1" to a remote network address of "3.3.3.1."

Thereafter, at step 406 a determination is made that the mobile node 200 now resides outside the security domain of the mobile node 200's home network (LAN 206). In an embodiment of the present invention, the mobile node 200 determines that it has moved outside the security domain of its home network (e.g., the security domain of a correspondent node to which a connection had previously been established) by checking its new network address and configuration against a policy maintained by the mobile node 200. For example, the policy on the mobile node 200 states that when a currently assigned IP address indicates a network other than 1.1.x.x, the mobile node 200 should consider itself to be in a different security domain. The policy further specifies that its VPN server, to which it should connect, has an IP address of 1.1.5.0.

At step 408 the VPN client 360 executing on the mobile node 200 initiates establishing a VPN tunnel connection through the VPN server executing in association with, for example, the gateway/firewall/modem 210. The VPN server connection is established after the mobile node 200 provides a set of logon credentials to the VPN server. In response to successful logon, the VPN server establishes a new address for the mobile node 200, by way of example 1.1.1.5, on the LAN 206 through dynamic host configuration protocol (DHCP) procedures—or alternatively any of a variety of protocols such as point-to-point protocol (PPP). Thus, upon completing step 408, the VPN server operates as a trusted messenger for the mobile node 200 on LAN 206. As the trusted messenger for mobile node 200, the VPN server provides authentication, security, and message integrity services for the mobile node 200 on the LAN 206.

Next, during step 410 the mobile node 200, through the VPN tunnel connection, provides its new network address (1.1.1.5) to its authoritative DNS server 209. As explained previously above, in accordance with an embodiment of the invention, the mobile node indicates during step 410 that non-authoritative DNS servers should not cache the new network address (1.1.1.5) for the mobile node. In a particular embodiment of the invention, this functionality is achieved by the mobile node 200 specifying a TTL of zero. As a consequence, nodes seeking to have the address of the mobile node will rely solely upon the authoritative DNS server 209 to provide an address for the mobile node 200.

Thereafter, at step 412 the mobile node 200, if desired, initiates re-establishing potentially lost connections with correspondent nodes by issuing a binding update to the last known addresses of the correspondent nodes. The binding update informs the correspondent nodes of the new address (1.1.1.5) assigned to the mobile node—the VPN server's address for the mobile node 200 upon completing step 408. If a correspondent node also changes its address (e.g., mobile node 214 also moves at substantially the same time as mobile node 200), then the binding update will fail. The mobile node 200 issues a naming query identifying the unique name assigned to the correspondent node. If the returned naming query address differs from an address currently held by the mobile node for the correspondent node, then the mobile node utilizes the provided address to issue another binding update. Upon receiving a binding update response, the connection between the mobile node and the correspondent node is restored during step 414.

It is noted that as a potential optimization (especially if mobile node 200 is aware that the intended recipient of the binding update is also mobile), rather than wait for an initial binding update request to fail, the mobile node 200 executes the naming query before receiving a response to the initial binding update request. If the response to the naming query differs from the address used during the initial binding update request, then the mobile node 200 issues a further binding update request. Such optimization, though possibly resulting in unneeded naming queries, expedites reconnecting to a correspondent node that has also relocated. The optimization can be further tailored to only trigger based upon the relative tolerance of applications to the length of disruption of a connection to a correspondent node when the mobile node 200 relocates. The above-described arrangement and method for reestablishing a connection, utilizing DNS and VPN server components within a dynamic network environment enables a mobile node to reestablish connections to correspondent nodes without reliance upon a home agent when the mobile node moves to an address location outside its home network.

Figure 5:
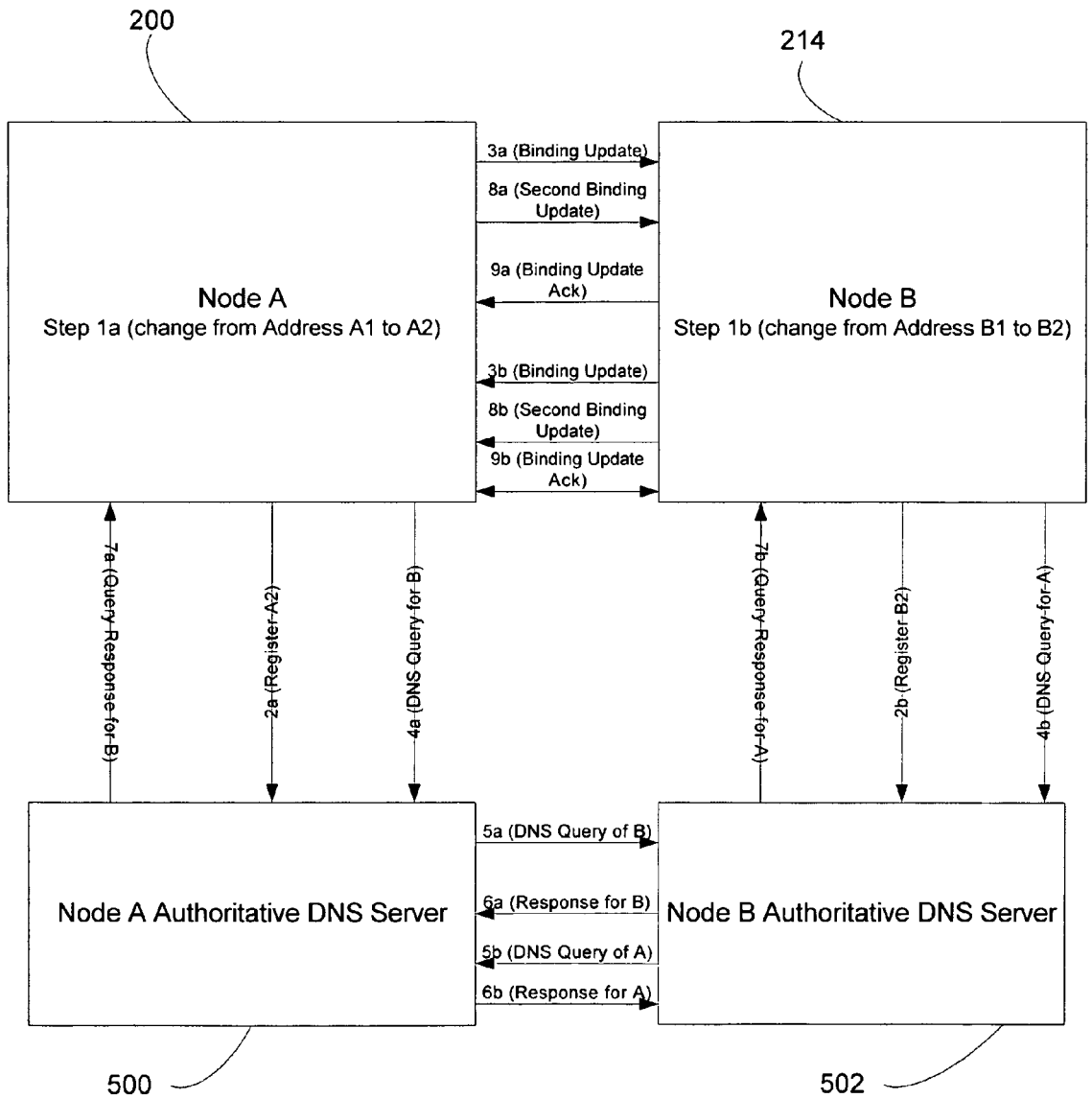
FIG. 5 summarizes a set of communications passed between a set of network nodes and their associated authoritative name servers in response to both nodes moving to new network locations at substantially the same time.

Turning to FIG. 5 an exemplary set of communications/actions are depicted for a scenario where two mobile nodes change their locations at substantially the same time. Initially, mobile nodes A and B (e.g., mobile nodes 200 and 214) are configured with their primary DNS suffixes. Nodes A and B also have connection-specific DNS suffixes for each of their adapters. The suffixes determine their current point of attachment DNS domains. Nodes A and B, register their addresses with their respective authoritative DNS servers 500 and 502 (which may be the same DNS server). The mobile nodes indicate that leaf DNS servers are not to cache their addresses by specifying a TTL of zero. A connection is established between Nodes A and B based upon their current addresses.

However, at steps 1a, 1b nodes A and B change their addresses. Next, during steps 2a, 2b nodes A and B acquire and register their new addresses with their authoritative DNS servers. During steps 3a, 3b the nodes A and B each issue binding updates to one another, but the destination of the binding update is the old address of each node. The binding updates therefore fail (potentially multiple times).

During step 4a, 4b the nodes A and B each query their DNS servers 500 and 502 to obtain the current address for their intended target. Because each specified a TTL of zero, the DNS servers 500 and 502 during steps 5a, 5b pass the requests to the authoritative DNS servers for the mobile nodes. During steps 6a, 6b the authoritative DNS servers 500 and 502 return the new addresses for nodes A and B. The naming query responses are passed back to nodes A and B during steps 7a, 7b.

Now in possession of the most recent addresses of the moved nodes, the nodes A and B re-issue their binding updates during steps 8a, 8b and receive successful acknowledgements of their binding updates during steps 9a, 9b. It is noted that only one of the binding updates for either node A or node B need to be issued/acknowledged to re-establish the disrupted connection (when the two nodes moved) since the recipient of the binding update will get the sender's new address in the update. It is further noted that in accordance with the previously-described optimization the nodes need not wait for one or more binding update failures before issuing a naming query to obtain the updated network address for a node.

Fast VPN Tunnel Re-use

Another enhancement to the previous known systems supporting mobile nodes involves handling of VPN tunnels. In particular, in accordance with an embodiment of the present invention, a mobile node's VPN tunnel is quickly reset as the mobile node moves from one external care of address to another external care of address. The quick VPN reset functionality is supported in part by an Internet security component (e.g., IPSEC) that resides on top of the TCP/IP layer 340 of the communications stack implemented by a mobile node.

The mobile node 200 can automatically and quickly establish a VPN connection if (1) it has the address of the VPN server on LAN 206 with which it will establish a VPN tunnel, and (2) a network access server (and any intervening networks) between the mobile node 200 and the VPN server allow the mobile node 200 access to the VPN server. Such access is facilitated by providing the VPN server address as part of the configuration of the mobile node 200. The address can be provided in any of a variety of ways including manually through a configuration user interface, from a DHCP server, through policy downloads. Furthermore, the network to which the mobile node connects provides access to the Internet. An authentication server for the outside network to which the mobile node 200 connects is configured to support guest connections to the Internet and consequently support connection to the LAN 206's VPN server, for nodes through a VLAN or VPN. Thereafter, the mobile node 200 potentially utilizes nested VPN (e.g., in case the guest connection is through a VPN) connections to reach a node within LAN 206's security domain. By way of example an L2TP/IPSEC or IPSEC tunnel mode VPN connection is created.

A performance optimization with regard to VPN connection setup enables fast reuse of the security data structures established for the mobile node 200 when its network address changes. This optimization is facilitated by the following enhancements to existing protocol stacks supporting network communications. First, the Internet security component (e.g., IPSEC) that resides on top of the TCP/IP layer 340 is called after processing the home address of the mobile node 200, and the home address, which does not change for the mobile node 200, is used to authenticate the mobile node for the VPN tunnel. The Internet SA (security association) is the context for the secure session between the machines. The attributes specified for an IP Security SA include, but are not limited to, IP addresses, authentication mechanism, cryptographic algorithm, algorithm mode, and key material. The Internet SA, which is based upon the home address, does not change when the mobile node 200 changes addresses. Therefore there is no need to update security structures (e.g., IPSEC filters) when the mobile node 200 changes its address.

Second, a previously established VPN tunnel between the mobile node 200 and a VPN server on the LAN 206 is reused. In an embodiment of the invention, a layer two tunneling protocol (L2TP) tunnel between the mobile node 200 and the VPN server on LAN 206 is maintained while the mobile node 200 moves between care of addresses according to mobile IPv6 rules. The mobile node 200 uses its first care of address external to the home security domain as its home address. It designates the first care of address as the home address and uses it for the tunnel and security structures to set up the VPN tunnel. Subsequently the IPSEC filters are set up with the home address.

Figure 6:
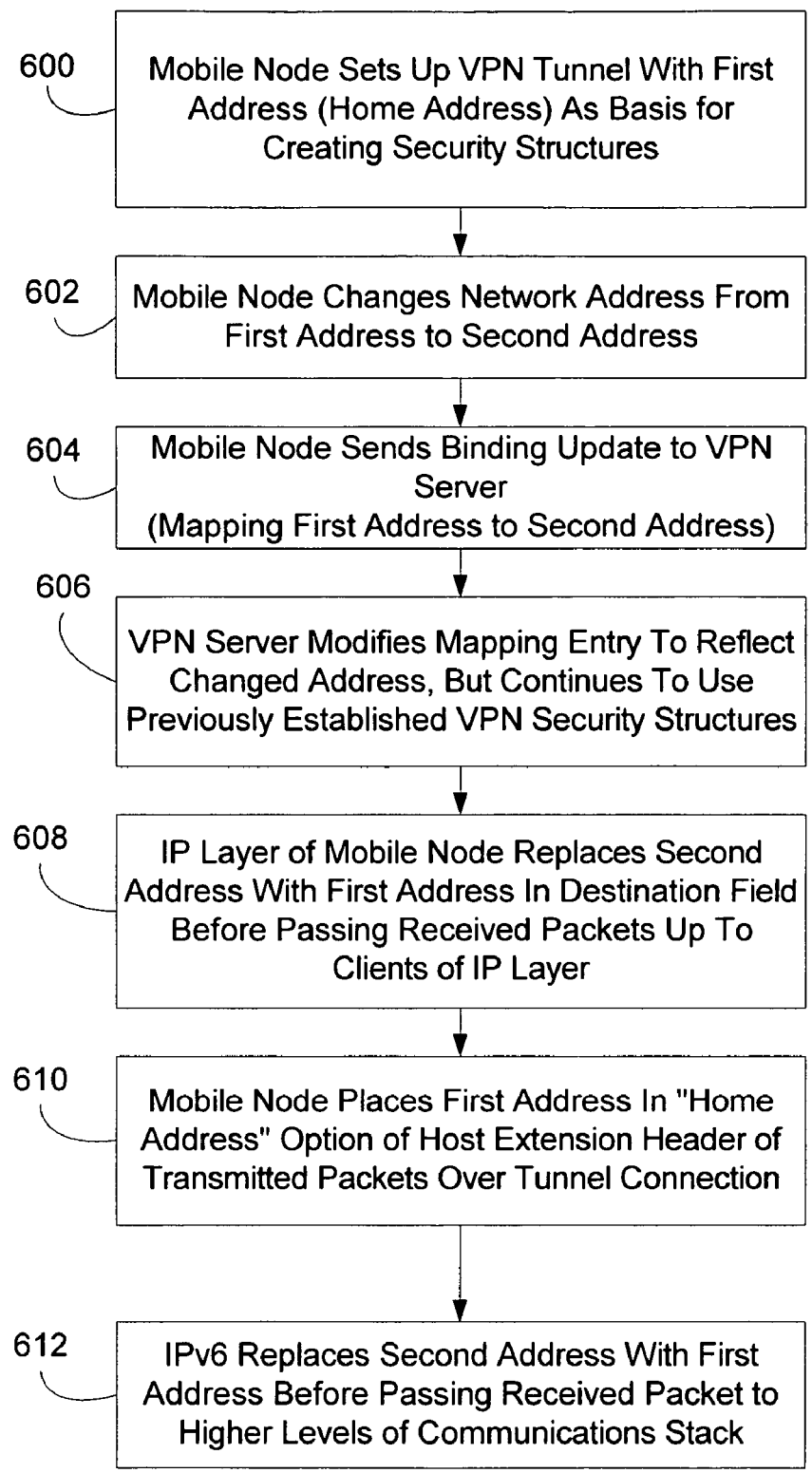
FIG. 6 summarizes a set of steps performed to carry out re-use of a virtual private node and its associated structures when a mobile node moves to a different external network address.

Turning to FIG. 6, a fast VPN tunnel re-use method supported by the above-described enhancements to VPN handling, when a mobile node changes its address multiple times in a public network, is summarized. Initially, during step 600 mobile node 200 sets up a VPN tunnel to the VPN server (e.g., an L2TP tunnel endpoint) on LAN 206 at a first external care of address. The mobile node makes the first external care of address its home address with regard to the external domain.

At step 602 the mobile node 200 changes its address to a second external address. The mobile node 200, at step 604, sends a binding update to its VPN server/tunnel endpoint. The binding update maps the first address to the second address in accordance with, by way of example, IPv6. In response to the binding update, at step 606 the VPN server modifies its mapping (originally first to first address) to map the first address to the new, second address, but maintains all the original Internet protocol security structures (e.g., the source address—the first care of address on the external network—of the client establishing the VPN tunnel and other fields associated with the client at its previous address) that were previously created when the VPN tunnel was created for the mobile node at the first external care of address. Tunnel structures are re-used as well. Examples of such tunnel structures include: type of tunnel (L2TP, IPSEC), IP address of the client, IP address of the tunnel server, (optionally) ports at both ends (if L2TP tunnel protocol), kind of security being employed (such as IPSEC). In general, the present invention maintains the relevance of the previously generated tunnel structures when the address of the mobile client changes. This is facilitated by always using the home address to look up the structure (e.g., replacing address in IP header by home address prior to lookup).

Thereafter, the VPN server will attach a routing extension header, with the destination header option specifying the first address as the destination address, to the IPv6 header of all packets sent to the mobile node 200's new (second) address.

At step 608, when the mobile node 200, at the second address, receives such packets, the IP layer replaces the second address by the first (external home) address for the mobile node. The modified packets are then passed up to a client of the IP layer (e.g., TCP, UDP, etc.). Therefore, while the mobile node 200 is indeed no longer at the first external care of address, the clients of the IP layer continue to believe that the mobile node 200 still resides at its first address.

At step 610, when the mobile node 200 sends packets to the VPN server for LAN 206, the mobile node 200 places the first address in a "home address" option of a host extension header attached to an IPv6 header. The second, new address of the mobile node is placed in the source address within the IPv6 header of a transmitted packet.

At step 612, when the VPN server receives the transmitted packet, an IPv6 stack component replaces the second address in the source field by the first address before passing the received packet to higher layers of the communications stack. Again, the higher layer stack components (responsible for tunneling, verifying the authenticity of the packets passed through the tunnel and filtering unauthorized packets), such as L2TP and IP security filtering, are unaware of the change in address for the mobile node 200. Thus, the originally created tunnel and security structures for the VPN tunnel between the mobile node 200 and the VPN server for LAN 206 continue to work.

In view of the many possible computing environments to which the principles of this invention may be applied and the flexibility of carrying out network access configuration to meet the challenges of maintaining addresses and connections in a networking environment including multiple mobile nodes, it should be recognized that the embodiment described herein is meant to be illustrative and should not be taken as limiting the scope of invention. Those skilled in the art to which the present invention applies will appreciate that the illustrative embodiment can be modified in arrangement and detail without departing from the spirit of the invention. Therefore, the invention as described herein contemplates all such embodiments as may come within the scope of the following claims and equivalents thereof.

What is claimed is:

1. A method for persisting virtual private network structures across multiple network addresses assigned to a mobile node, the method comprising:
    setting up a virtual private network tunnel between a virtual private network tunnel server and the mobile node, wherein virtual private network structures supporting the virtual private network tunnel are based upon a home address specified for the mobile node;
    assigning a new network address to the mobile node, the new network address differing from the home address for the mobile node;
    transmitting, by the mobile node, a binding update to the virtual private network tunnel server specifying the new network address; and
    creating a mapped relation from the new network address to the home address for the mobile node and transmitting the home address and the new network address using a message packet with an extension header, thereby facilitating continued use of virtual private network structures that are based upon the home address for the mobile node.

2. The method of claim 1 wherein the virtual private network structures comprise security structures.

3. The method of claim 2 wherein the security structures comprise Internet security structures.

4. The method of claim 1 wherein the virtual private network structures comprise tunnel structures.

5. The method of claim 1 further comprising updating, by the virtual private network tunnel server, a mapping structure to incorporate the new network address information provided within the binding update.

6. The method of claim 1 further comprising the steps of:
    receiving, by the mobile node, the message packet with the extension header from the virtual private network tunnel server; and
    replacing, by the mobile node, the new network address with the home address in a destination field of the received message packet.

7. The method of claim 6 wherein the replacing, by the mobile node, is performed by an intermediate protocol stack layer that implements packet address handling policies and wherein the received message packet is thereafter passed up to clients of the intermediate protocol stack layer.

8. The method of claim 7 wherein the intermediate protocol stack layer comprises an Internet protocol layer.

9. The method of claim 1 further comprising the step of:
    placing, by the mobile node, the new network address within the source address field and the home address within the extension header of packets transmitted to the virtual private network tunnel server.

10. The method of claim 9 further comprising the step of:
    replacing, by the virtual private network tunnel server, the new network address by the home address specified within the extension header of the packets transmitted by the mobile node to the virtual private network tunnel server.

11. The method of claim 10 wherein the replacing step is performed by an intermediate protocol stack layer that implements packet address handling policies and wherein the received packets are thereafter passed up to clients of the intermediate protocol stack layer.

12. A computer-readable medium including computer-executable instructions for facilitating persisting virtual private network structures across multiple network addresses assigned to a mobile node, the method comprising:

setting up a virtual private network tunnel between a virtual private network tunnel server and the mobile node, wherein virtual private network structures supporting the virtual private network tunnel are based upon a home address within a home network specified for the mobile node;

receiving a new network address for the mobile node, the new network address differing from the home address for the mobile node;

transmitting, by the mobile node, a binding update to the virtual private network tunnel server specifying the new network address; and creating a mapped relation from the new network address to the home address for the mobile node, thereby facilitating continued use of virtual private network structures that are based upon the home address for the mobile node by selectively processing received packets within a tunnel driver of an intermediate protocol stack layer of the mobile node, the processing within the tunnel driver being bypassed when the mobile node is connected in the home network.

13. The computer-readable medium of claim 12 wherein the virtual private network structures comprise security structures.

14. The computer-readable medium of claim 13 wherein the security structures comprise Internet security structures.

15. The computer-readable medium of claim 12 wherein the virtual private network structures comprise tunnel structures.

16. The computer-readable medium of claim 12 further comprising updating, by the virtual private network tunnel server, a mapping structure to incorporate the new network address information provided within the binding update.

17. The computer-readable medium of claim 12 further comprising computer executable instructions for performing the step, of:
  receiving, by the mobile node, a message packet with an extension header including the new network address from the virtual private network tunnel server; and
  wherein the processing within the tunnel driver comprising replacing the new network address with the home address in a destination field of the received message packet.

18. The computer-readable medium of claim 17 wherein the replacing step is performed by the intermediate protocol stack layer that implements packet address handling policies and wherein the received message packet is thereafter passed up to clients of the intermediate protocol stack layer.

19. The computer-readable medium of claim 18 wherein the intermediate protocol stack layer comprises an Internet protocol layer.

20. The computer-readable medium of claim 12 further comprising computer-executable instructions for performing the step of:
  placing, by the mobile node, the new network address within the source address field and the home address within an extension header of packets transmitted to the virtual private network tunnel server.

21. A mobile network node facilitating persisting virtual private network structures across multiple network addresses assigned to the mobile node, the mobile node including a communications protocol stack comprising computer-executable instructions facilitating performing, by the mobile node, the steps of:
  setting up a virtual private network tunnel between a virtual private network tunnel server and the mobile node, wherein virtual private network structures supporting the virtual private network tunnel are based upon a home address specified for the mobile node;

receiving a new network address for the mobile node, the new network address differing from the home address for the mobile node;

transmitting, by the mobile node, a binding update to the virtual private network tunnel server specifying the new network address;

transmitting the home address and the new network address using a message packet with an extension header;

facilitating continued use of virtual private network structures that are based upon the home address for the mobile node by selectively processing received packets within a tunnel driver of an intermediate protocol stack layer of the mobile node to replace the new network address with the home address in a destination field of the message packet, the processing within the tunnel driver being bypassed when the mobile node is connected in the home network.

22. The mobile node of claim 21 wherein the virtual private network structures comprise security structures.

23. The mobile node of claim 22 wherein the security structures comprise Internet security structures.

24. The mobile node of claim 21 wherein the virtual private network structures comprise tunnel structures.

25. The mobile node of claim 21 further comprising computer executable instructions for performing the step of:
  receiving, by the mobile node, the message packet with an extension header including the new network address from the virtual private network tunnel server.

26. The mobile node of claim 25 wherein following the replacing the received message packet is passed up to clients of the intermediate protocol stack layer.

27. The mobile node of claim 26 wherein the intermediate protocol stack layer comprises an Internet protocol layer.

28. The mobile node of claim 21 further comprising computer-executable instructions for performing the step of:
  placing, by the mobile node, the new network address within the source address field and the home address within the extension header of packets transmitted to the virtual private network tunnel server.

29. A virtual private network (VPN) server facilitating persisting virtual private network structures across multiple network addresses assigned to a mobile node, the VPN server including computer-executable instructions facilitating performing, by the VPN server, the steps of:
  setting up a virtual private network tunnel between the VPN server and the mobile node, wherein virtual private network structures supporting the virtual private network tunnel are based upon a home address specified for the mobile node;

receiving, from the mobile node, a binding update to the virtual private network tunnel server specifying a new network address that was assigned to the mobile node, the new network address differing from the home address for the mobile node;

transmitting the home address and the new network address using a message packet with an extension header; and creating a mapped relation from the new network address to the home address for the mobile node, thereby facilitating continued use of virtual private network structures that are based upon the home address for the mobile node by replacing the new network address with the home address.

30. The VPN server of claim 29 wherein the virtual private network structures comprise security structures.

31. The VPN server of claim 30 wherein the security structures comprise Internet security structures.

32. The VPN server of claim 29 wherein the virtual private network structures comprise tunnel structures.

33. The VPN server of claim 29 further comprising updating, by the virtual private network tunnel server, a mapping structure to incorporate the new network address information provided within the binding update.

34. The VPN server of claim 29 further comprising computer executable instructions for performing the steps of:
   receiving, by the VPN server, a message packet including the new network address from the mobile node
   replacing, by the virtual private network tunnel server, the new network address with the home address specified within the extension header of the received message packet.

35. The VPN server of claim 34 wherein the replacing, by the virtual private network tunnel server, is performed by an intermediate protocol stack layer that implements packet address handling policies and wherein the received packets are thereafter passed up to clients of the intermediate protocol stack layer.

36. The VPN server of claim 35 wherein the intermediate protocol stack layer comprises an Internet protocol layer.

* * * * *